United States Patent [19]

Jabbari et al.

[11] Patent Number: 5,177,650
[45] Date of Patent: Jan. 5, 1993

[54] DISC DRIVE ASSEMBLY WITH IMPROVED COMMUNICATIONS AND REDUCED CONTAMINATION RISK

[75] Inventors: Iraj Jabbari; Brian L. Phillips, both of Santa Clara County, Calif.

[73] Assignee: Seagate Technology, Inc., Scotts Valley, Calif.

[21] Appl. No.: 613,263

[22] Filed: Nov. 9, 1990

[51] Int. Cl.⁵ .............................................. G11B 17/14
[52] U.S. Cl. ............................... 360/99.08; 360/99.04
[58] Field of Search ............... 360/99.08, 98.07, 99.09, 360/99.11; 310/67 R, 156

[56] References Cited

U.S. PATENT DOCUMENTS 4,965,476  10/1990  Lin ................................. 360/99.08
4,965,686  10/1990  Young et al. ..................... 360/99.08
5,031,061   7/1991  Hatch ............................. 360/98.07

Primary Examiner—David J. Severin
Attorney, Agent, or Firm—Flehr, Hohbach, Test, Albritton & Herbert

[57] ABSTRACT

A disc drive assembly includes a brushless direct current drive motor having a stationary shaft and a hub rotatably mounted about the stationary shaft by upper and lower bearings. The hub includes an interior space for housing a stator which has magnetically active parts for magnetic interaction with a permanent magnet mounted on an inner surface of the hub. The brushless drive motor is releasably mounted on a disc drive base member having a centrally located boss. The boss cooperates with a lower surface of a stator support for maintaining the stator of the drive motor in spaced relation with respect to the disc drive base member so that a printed circuit connector may be disposed between the stator and the disc drive base member proximate the stator winding. The subject invention also includes a labyrinth seal in combination with a ferrofluidic seal to prevent contaminant particles generated by the bearings and other internal parts of the drive motor from escaping into a contaminant-free disc storage environment.

8 Claims, 4 Drawing Sheets

DISC DRIVE ASSEMBLY WITH IMPROVED COMMUNICATIONS AND REDUCED CONTAMINATION RISK

FIELD OF THE INVENTION

This invention relates to a novel disc storage device. More particularly, this invention relates to a disc drive assembly for maintaining electromagnetic communication between a disc drive motor and associated printed circuitry.

BACKGROUND OF THE INVENTION

In disc storage devices, programmable data is stored as bits in circular tracks on rigid or flexible discs. In order to access the stored data, a read/write disc head scans the circular tracks of the storage disc and converts the magnetic codes recorded on the surface of the disc into electric code signals as the disc is rotated about a shaft at relatively high speeds by a disc drive motor. In operation, the read/write head must be positioned accurately relative to the particular track which is being inscribed or read because an error in the position of the head could alter or, in extreme cases, permanently damage the stored program or data. Accordingly, the disc speed must be controlled to accommodate movement of the read/write head.

Typically, disc speed is controlled by drive electronics and speed control circuits which electromagnetically communicate with a disc drive motor. More particularly, drive electronics and speed control circuitry are etched or soldered onto printed circuit boards or the like, and connector circuitry, such as hard wires, couple the printed circuit boards to the disc drive motor to transmit electronic control signals between the printed circuitry and the disc drive motor.

In the past, disc storage devices have included wire connectors coupled to printed circuit boards which carry signals from circuit components for controlling and regulating the driving motor, as will now be described below in association with FIG. 1. There will be seen a conventional disc storage drive 10 including a stationary shaft 12, a hub 14 rotatably mounted about the shaft by bearings 16 and 18, and a magnetically active stator, generally designated 20, including stator stack 22 and stator windings 24. An annular rotor magnet 26 is shown mounted on an inner surface 28 of hub 14 to magnetically interact with the magnetic parts of the stator.

Speed control circuitry and other drive electronics are coupled to the disc drive motor through stator winding connections 30 which are channeled through stationary shaft 12. The winding connections 30 may be soldered or otherwise coupled to the stator windings 24 as shown at 32. At an opposite end, winding connections 30 are connected to printed circuitry which controls the amount of current supplied to the stator windings, and therefore controls the speed and operation of the drive motor.

Although such connections facilitate transfer of current from external circuitry to the stator windings of the disc drive motor, soldering the connecting wires to the stator and external circuitry is a labor intensive assembly process since all such connections must be reliable and exact. Moreover, confining the connecting wiring within the shaft results in a design having poor field serviceability. Further, external connecting wires are undesirable in view of the current trend towards high density circuitry.

Another problem encountered in prior disc drive devices occurs when contaminant particles, such as lubricant and/or metal particles produced by the rotation of the bearings, escape from the interior of the motor to the "clean environment" disc storage area of the drive. The contaminant particles may cause operational difficulties or, more significantly, permanently damage the stored discs, heads and other sensitive drive elements. Additionally, dust and dirt produced by the highly structured winding surface may also be detrimental to the operation of the disc drive device.

It has been realized in the past to include ferrofluidic seals in disc drive motors to prevent emanation of dust and dirt from the interior mechanical workings of the motor to the disc storage area. Ferrofluidic seals induce a sealing action between stationary and rotary parts of the disc drive motor by combining magnetic fields and lubricant emulsions containing magnetically conductive particles at the junction of the stationary and rotary parts.

Labyrinth seals have also been designed in past disc drive motor devices to significantly reduce, and in some cases completely prevent, the passage of contaminant particles from the internal parts of the disc drive motor to the area housing the storage discs. The term "labyrinth seal" refers to an intricate, circuitous path or tight enclosure defined by the structure of the motor that inhibits the movement of particulate matter from the interior of the motor, as opposed to a complete closure such as produced by a ferrofluidic seal.

Although these disc drive designs utilizing ferrofluidic or labyrinth seals have effectively prevented contaminated particles from damaging stored discs, such designs require numerous parts to effectively construct the contaminant-proof seals, resulting in high manufacturing costs.

The difficulties suggested in the preceding are not intended to be exhaustive but rather are among many which tend to reduce the effectiveness of prior disc drive assemblies. Other noteworthy problems may also exist; however, those presented above should be sufficient to demonstrate that such disc drive assemblies appearing in the past will admit to worthwhile improvement. Accordingly, it is therefore a general object of the invention to provide a disc drive assembly which will obviate or minimize difficulties of the type previously described.

It is a specific object of the invention to provide a disc drive assembly which permits electronic communication between a printed circuit board and a stator of a disc drive motor.

It is another object of the invention to provide a disc drive assembly which eliminates external wiring and thereby reduces the number of components necessary for communication between a printed circuit board and a disc drive motor.

It is still another object of the invention to provide a disc drive assembly which reduces the risk of contaminant particles escaping from the disc drive motor into the "clean environment" disc storage area.

It is a further object of the invention to provide a disc drive assembly which is easily assembled, compact, easily serviceable, and economical to manufacture.

DISCLOSURE OF THE INVENTION

A preferred embodiment of the invention which is intended to accomplish at least some of the foregoing objects includes a brushless direct current drive motor having a stationary shaft and a hub rotatably mounted about the stationary shaft by upper and lower bearings. The hub includes an interior space for housing a stator which has stator windings and magnetically active parts for magnetic interaction with a permanent magnet mounted on an inner surface of the hub. The drive motor further includes a stator support mounted to the stationary shaft.

The brushless drive motor is mounted on a disc drive base member having a centrally located boss for receipt of the stationary shaft of the disc drive motor. The stationary shaft includes a threads at one end for releasably securing the shaft to a bolt through the boss to affix the motor on the disc drive base member. The boss cooperates with a lower surface of the stator support for maintaining the stator of the drive motor in spaced relation with respect to the disc drive base member so that a printed circuit connector may be disposed between the stator and the disc drive base member proximate the stator winding. In this manner, the configuration of the subject disc drive assembly permits electronic communication between the stator windings and a printed circuit board or other external circuitry without the necessity of channelling connecting wires through the stationary shaft.

In another aspect of a preferred embodiment of the subject invention, an upper surface of the hub supports at least one storage disc in a contaminant-free environment. In order to maintain the "clean environment", a preferred embodiment of the subject invention includes a labyrinth seal defined by an inner surface of the hub, an outer surface of the stator, and an upper surface of the stator support. The labyrinth seal, in combination with a ferrofluidic seal positioned above the upper bearings, serves to prevent contaminant particles generated by the bearings and other internal parts of the drive motor from escaping into the contaminant-free environment.

BRIEF DESCRIPTION OF THE DRAWINGS

Other objects and advantages of the present invention will become apparent from the following detailed description of a preferred embodiment thereof taken in conjunction with the accompanying drawings, wherein.

BEST MODE OF CARRYING OUT THE INVENTION

Figure 1:
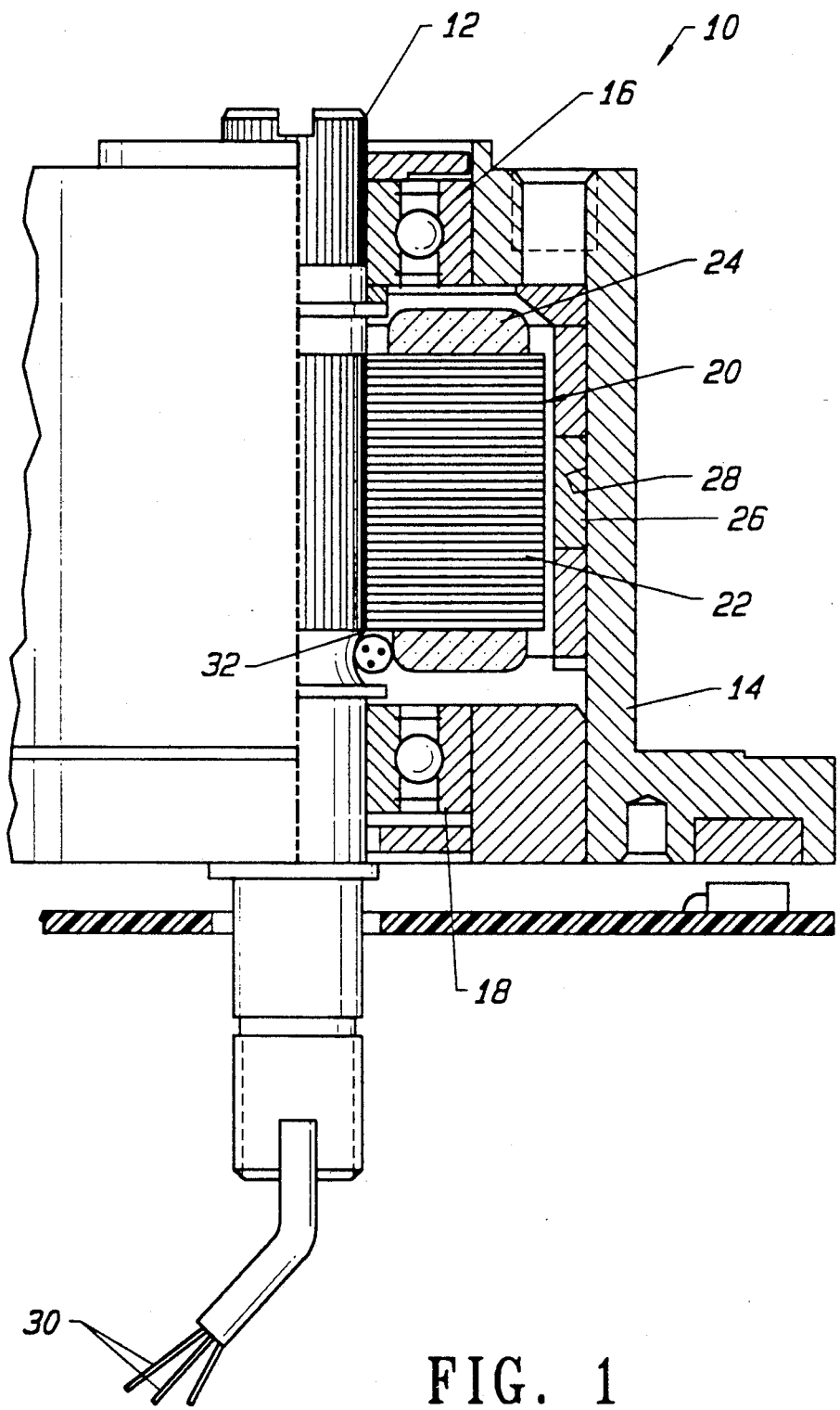
FIG. 1 is a side elevation view, in partial cross section, of a prior art disc memory drive including stator winding connectors channeled through a stationary shaft of a drive motor.
Figure 2:
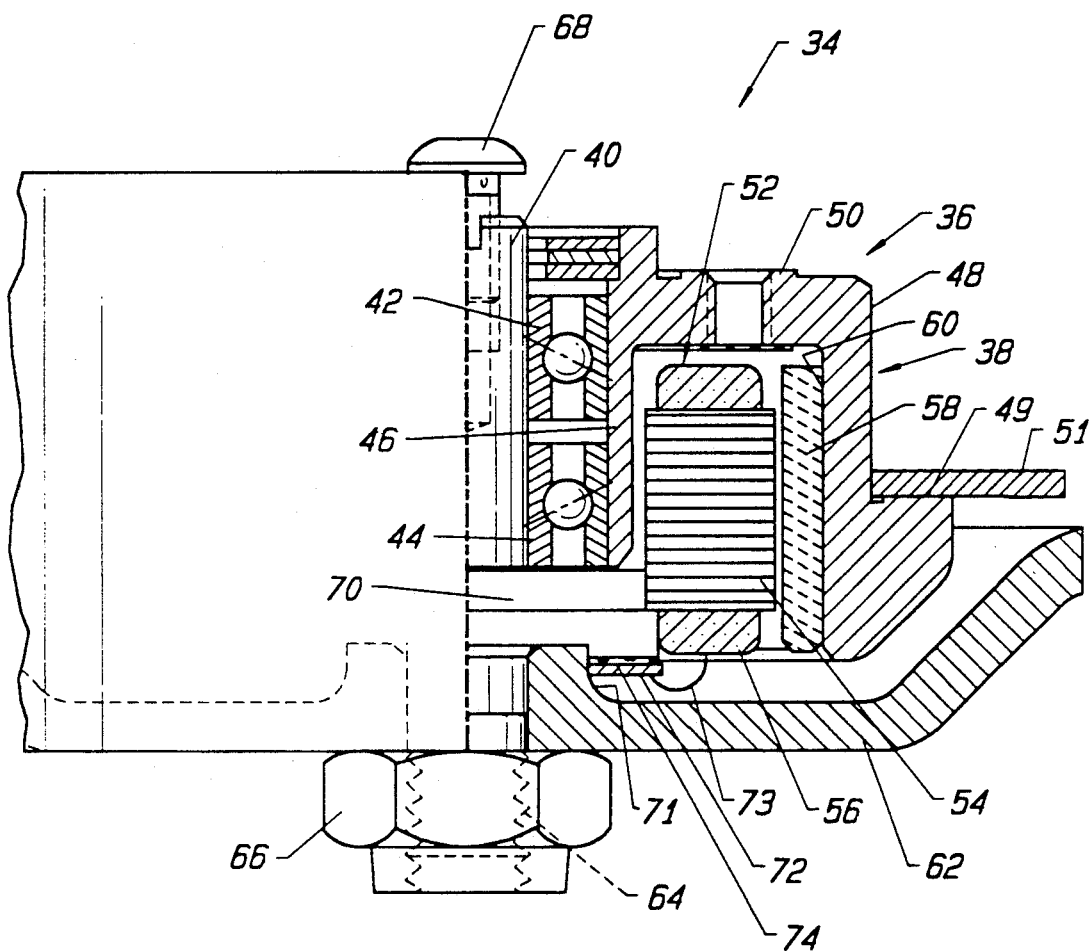
FIG. 2 is a side elevation view, in partial cross section, of the subject storage disc assembly in accordance with a preferred embodiment of the invention.

Referring now to the drawings, wherein like numerals indicate like parts, and initially to FIG. 2, there will be seen a partial cross section of a disc drive assembly 34 in accordance with a preferred embodiment of the invention. The disc drive assembly 34 includes a brushless direct current motor 36 having a hub 38 rotatably mounted about stationary shaft 40 by upper and lower bearings 42 and 44, respectively. The hub 38 is formed in a generally inverted U-shape in cross section and has an inner annular arm 46, and outer annular arm 48, and a top portion 50. Outer annular arm 48 includes a shoulder 49 for supporting a storage disc 51 in a contaminant-free environment. A plurality of storage discs separated by spacers or washers may be stacked along the length of outer annular arm 48.

The interior portion of hub 38 operably receives a stator, generally designated 52, including stator lamination stack 54 and stator windings 56. A permanent magnet 58 is mounted on an inner surface 60 of outer annular arm 48 for magnetically interacting with magnetically active stator lamination stack 54 and stator windings 56. It is to be understood that a plurality of permanent magnet segments may be substituted for permanent magnet 58.

The disc drive motor 36 is releasably mounted to a base member 62 of disc drive assembly 34 by inserting shaft 40 through a centrally located aperture in base member 62. To facilitate securement of motor 36 to base member 62, stationary shaft 40 includes a threads 64 at one end for releasable attachment to mating threads in nut 66. At an opposite end of stationary shaft 40, a screw 68 secures a top plate (not shown) of disc drive assembly 34 to disc drive motor 36.

A stator support 70 is mounted to stationary shaft 40 for supporting stator 52 in a substantially vertical position. Stator support 70 is in turn supported by a boss 71 formed in base plate member 62 which serves to maintain disc drive motor 36 in a spaced relation with respect to base member 62.

A printed circuit connector 72 is mounted to a lower surface 74 of stator support 70 proximate base member 62. Printed circuit connector 72 is electronically connected to stator windings 56 by a wire 73 for electrical communication between the stator windings and a printed circuit board (not shown). Circuitry is etched on a lower surface of circuit connector 72 for transmitting electrical signals from drive electronics or speed control circuits carried on external printed circuit boards or the like, as will be described in more detail in connection with FIGS. 4 and 5.

Figure 3:
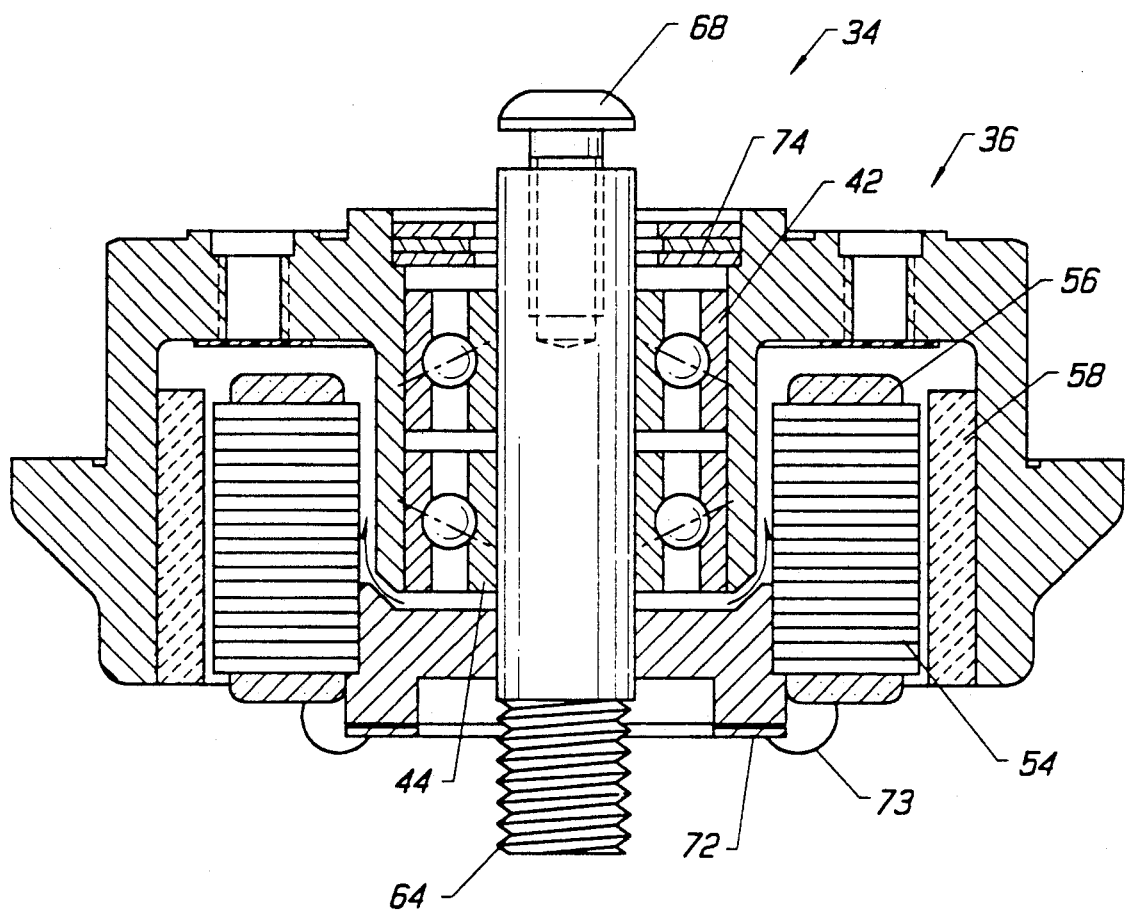
FIG. 3 is a side elevation view, in cross section, of a brushless drive motor associated with the subject storage disc assembly.

Turning now to FIG. 3, another aspect of the subject disc drive assembly will now be described. Storage disc receiving areas are preferably contaminant-free environments to protect storage discs from particulate matter generated by the mechanical rotation of bearings or other rotary parts of disc drive motor. In order to prevent dirt particles, grease vapors and the like from escaping into storage disc receiving area, the subject disc drive assembly includes a ferrofluidic seal 74 in combination with a labyrinth seal. This combination of seals ensure effective sealing of the internal space of the motor relative to a disc storage area.

The ferrofluidic seal is positioned above upper bearing 42 to prevent leakage of airborne dust or dirt from the upper bearing into disc storage area. Solid particulate matter will accumulate near the lower bearing 44 due to gravitational forces. In order to prevent the escape of this contaminant matter, the subject invention includes a labyrinth seal to reduce the risk of particulate matter escaping from the interior of the disc drive motor. The labyrinth seal is defined by an upper surface of stator support 70, an inner surface of hub 38, and an outer surface of stator 52. Particles must travel in the direction of the arrows against gravity to escape from the labyrinth seal. Thus, the unique design of the subject disc drive assembly 34 includes both a ferrofluidic seal and a labyrinth seal in which the novel dimensional configuration of the standard disc drive motor components of a hub or motor casing, a stator, and a stator support defined the labyrinth seal.

Figure 4:
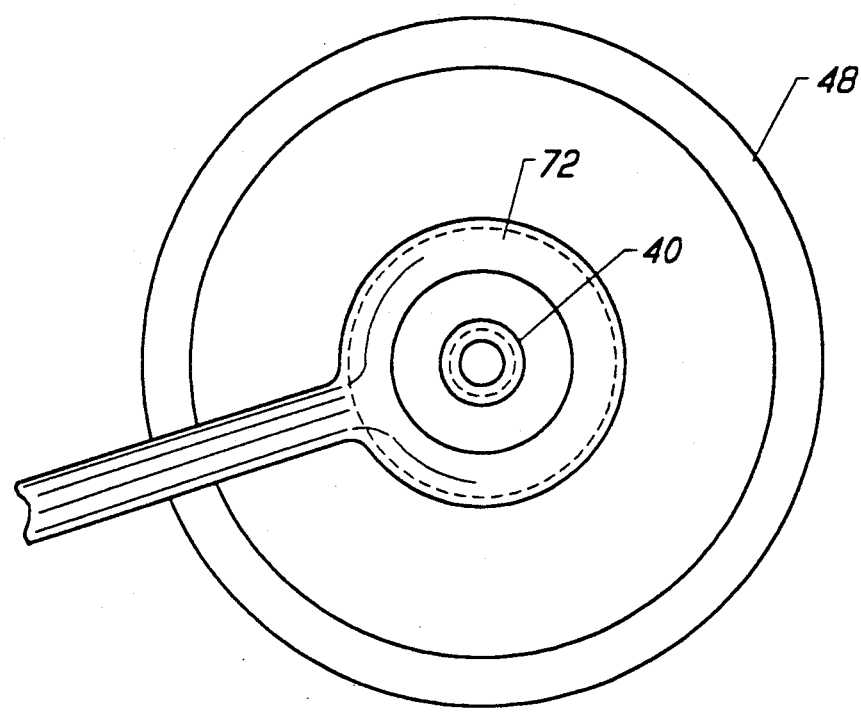
FIG. 4 is a bottom plan view of a portion of a printed circuit connector and a hub of a drive motor associated with the subject storage disc assembly.
Figure 4:
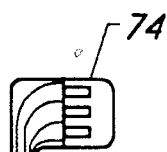

Turning now to FIG. 4, there will be seen a bottom plan view of the subject disc drive assembly without the disc drive base member and depicts the relative dimensions of the outer annular arm 48 of the hub, printed circuit connector 72, and stationary shaft 40. The inner diameter of the annular ring of printed circuit connector 72 is dimensioned to register with the outer diameter of the boss on the disc drive base member.

Printed circuit connector 72 includes etched circuitry for transmitting electrical signals between a printed circuit board positioned external to the subject drive assembly and the stator windings of the disc drive motor. In this connection, the printed circuit connector may be fabricated from plastic or any other suitable nonconductive material.

Figure 5:
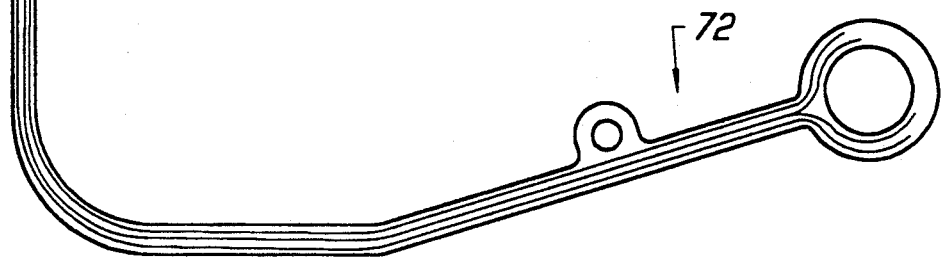
FIG. 5 is a bottom plan view of a printed circuit connector for use in association with the subject storage disc assembly.

FIG. 5 shows the bottom surface of the printed circuit connector including an end 74 for attachment to a printed circuit board. A series of pins (not shown) on the bottom surface of end 74 may be soldered to a printed circuit board carrying drive electronics, speed control circuits, or other circuitry for controlling the operation of the disc drive motor.

After reading and understanding the foregoing inventive disc drive assembly, in conjunction with the drawings, it will be appreciated that several distinct advantages of the subject invention are obtained.

Without attempting to set forth all of the desirable features of the instant disc drive assembly, at least some of the major advantages include a disc drive base member 62 having a boss 71 cooperating with a stator support 70 of a disc drive motor 36 to maintain the disc drive motor spaced apart from the base member. The spacing between the motor and the base member permits a printed circuit connector to be positioned proximate stator windings 56 for electrical communication between a printed circuit board and the stator windings, eliminating external wiring and thus reducing the number of necessary for controlling the disc drive motor.

During assembly, the annular ring of the printed circuit connector may be mounted about the boss of the disc drive base member, and then the shaft may be releasably attached to the base member. The unique design of the base member in association with the threaded connections of the stationary shaft of the disc drive motor facilitates assembly of the disc drive. Moreover, should the printed circuit connector become damaged, the threaded engagement of the shaft to the base member permits easy serviceablility.

In describing the invention, reference has been made to a preferred embodiment and illustrative advantages of the invention. Those skilled in the art, however, and familiar with the instant disclosure of the subject invention, will recognize additions, deletions, modifications, substitutions, and other changes which will fall within the purview of the subject invention and claims.

What is claimed is:

1. A disc drive assembly for receiving at least one storage disc in a contaminant-free environment, said disc drive assembly comprising:

a brushless drive motor having a stationary shaft and a hub mounted about said stationary shaft, said hub including an interior space for receiving a stator therein, said stator having winding means and magnetically active parts including a stator stack lamination for magnetic interaction with a permanent magnet mounted on an inner surface of said hub, said brushless drive motor further including means for mounting said stator to said stationary shaft and for supporting said stator in a generally fixed position relative to said hub, said hub rotatably mounted to said stationary shaft by upper and lower bearing means, each of said upper and lower bearing means having an inner race mounted to said stationary shaft and an outer race mounted to said hub, said hub having a shoulder means for supporting said at least one storage disc in said combustion-free environment; and a disc drive base member for mounting said brushless drive motor thereon, said disc drive base member including a boss for receiving an end of said stationary shaft of said brushless drive motor, said stationary shaft including threaded connecting means for releasably securing said stationary shaft to said disc drive base member through an aperture in said boss, said boss cooperating with a lower surface of said stator mounting and supporting means for maintaining said stator of said brushless drive motor in spaced relation with respect to said disc drive base member so that a printed circuit connector may be disposed between said stator and said disc drive base member proximate said winding means for permitting electronic communication between said winding means and the associated printed circuitry from an external controller.

2. A disc drive assembly as defined in claim 1 wherein said threaded connecting means of said stationary shaft operably engages mating threaded connecting means of a nut to releasably secure said stationary shaft to said disc drive base member.

3. A disc drive assembly as defined in claim 1 wherein said printed circuit connector comprises:
   an annular portion at one end for mounting said printed circuit connector around said boss.

4. A disc drive assembly as defined in claim 1 further comprising:
   a labyrinth seal defined by an inner surface of said hub, an outer surface of said stator, and an upper surface of said stator mounting and supporting means to prevent contaminant particles generated by said upper and lower bearing means or other internal parts of said brushless drive motor from escaping into said contaminant-free environment.

5. A disc drive assembly as defined in claim 1 further comprising:
   a ferrofluidic seal disposed above said upper bearing means and between said hub and said stationary shaft to prevent airborne contaminant particles generated by said upper bearing means or other internal parts of said brushless drive motor from escaping into said contaminant-free environment.

6. A disc drive assembly as defined in claim 1 wherein:

said hub being formed in a generally inverted U-shape in cross-section, said hub having an upper surface, an inner annular arm mounted to said outer race of said upper and lower bearing means, and an outer annular arm for carrying said permanent magnet.

7. A disc drive assembly as defined in claim 6 wherein said outer annular arm carries said shoulder means.

8. A disc drive assembly for receiving at least one storage disc in a contaminant-free environment, said disc drive assembly comprising:

a brushless drive motor having a stationary shaft and a hub mounted about said stationary shaft, said hub including an interior space for receiving a stator therein, said stator having winding means and magnetically active parts including a stator stack lamination for magnetic interaction with a permanent magnet mounted on an inner surface of said hub, said brushless drive motor further including means for mounting said stator to said stationary shaft and for supporting said stator in a generally fixed position relative to said hub, said hub rotatably mounted to said stationary shaft by upper and lower bearing means, each of said upper and lower bearing means having an inner race mounted to said stationary shaft and an outer race mounted to said hub, said hub having a shoulder for positioning said at least one storage disc in said contaminant-free environment;

a labyrinth seal defined by an inner surface of said hub, an outer surface of said stator, and an upper surface of said stator mounting and supporting means to prevent contaminant particles generated by said upper and lower bearing means or other internal parts of said brushless drive motor from escaping into said contaminant-free environment;

a ferrofluidic seal disposed above said upper bearing means and between said hub and said stationary shaft to prevent airborne contaminant particles generated by said upper bearing means or other internal pats of said brushless drive motor from escaping into said contaminant-free environment; and a disc drive base member for mounting said brushless drive motor thereon, said disc drive base member including a boss for receiving an end of said stationary shaft of said brushless drive motor, said stationary shaft including threaded connecting means for releasably securing said stationary shaft to said disc drive base member through an aperture in said boss, said boss cooperating with a lower surface of said stator mounting and supporting means for maintaining said stator of said brushless drive motor in spaced relation with respect to said disc drive base member so that a printed circuit connector may be disposed between said stator and said disc drive base member proximate said winding means for permitting electronic communication between said magnetically active winding means and the associated printed circuitry from an external controller.

* * * * *